United States Patent
Schaeuble

(10) Patent No.: US 9,745,146 B2
(45) Date of Patent: Aug. 29, 2017

(54) CONVEYING DEVICE

(71) Applicant: Robert Bosch GmbH, Stuttgart (DE)

(72) Inventor: Tobias Schaeuble, Ühlingen-Birkendorf (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/029,144

(22) PCT Filed: Oct. 10, 2014

(86) PCT No.: PCT/EP2014/071754
§ 371 (c)(1),
(2) Date: Apr. 13, 2016

(87) PCT Pub. No.: WO2015/055529
PCT Pub. Date: Apr. 23, 2015

(65) Prior Publication Data
US 2016/0244273 A1    Aug. 25, 2016

(30) Foreign Application Priority Data

Oct. 16, 2013   (DE) .................. 10 2013 221 031

(51) Int. Cl.
*B65G 25/08*  (2006.01)
*B65G 47/46*  (2006.01)
(Continued)

(52) U.S. Cl.
CPC ............ *B65G 47/91* (2013.01); *B31B 1/80* (2013.01); *B65B 43/46* (2013.01); *B65B 43/54* (2013.01);
(Continued)

(58) Field of Classification Search
CPC ...... B31B 1/80; B65G 47/914; B65G 47/763; B65G 47/91; B65G 17/16; B65G 43/10;
(Continued)

(56) References Cited

U.S. PATENT DOCUMENTS 3,977,307 A    8/1976  Roberts
4,018,328 A *  4/1977  Galarowic ............ B65G 25/10
                                                        198/741
(Continued)

FOREIGN PATENT DOCUMENTS

| DE | 2612070 | 11/1976 |
|---|---|---|
| DE | 8411650 | 8/1985 |
| DE | 102012006278 | 10/2013 |
| EP | 398726 | 11/1990 |
| EP | 2436603 | 4/2012 |

(Continued)

OTHER PUBLICATIONS

International Search Report for Application No. PCT/EP2014/071754 dated Jan. 28, 2015 (English Translation, 3 pages).

*Primary Examiner* — Mark A Deuble
(74) *Attorney, Agent, or Firm* — Michael Best & Friedrich LLP

(57) ABSTRACT

The invention starts from a conveying device (10c) having at least one transport unit (20'c, 20"c) for transporting packaging blanks (12c) and/or containers (14'c, 14"c) in a transport direction (16c) along a transport path (18c), wherein the transport unit has at least one conveying element (24'c, 24"c) which can be driven along a section (22c) of the transport path (18c). It is proposed that at least one conveying element (24'c, 24"c) has a rear side (26'c, 26"c) which in at least one operating state is intended to pull packaging blanks (12c) and/or containers (14'c, 14"c) in the transport direction (16c), and a front side (28'c, 28"c) which in at least one operating state is intended to push packaging blanks (12c) and/or containers (14'c, 14"c) in the transport direction (16c). The invention also relates to a packing machine comprising such a conveying device.

19 Claims, 3 Drawing Sheets

(51) Int. Cl.
 *B65G 17/16* (2006.01)
 *B65G 47/91* (2006.01)
 *B31B 1/80* (2006.01)
 *B65B 43/46* (2006.01)
 *B65B 43/54* (2006.01)
 *B65G 43/10* (2006.01)
 *B65G 47/76* (2006.01)

(52) U.S. Cl.
 CPC .............. *B65G 17/16* (2013.01); *B65G 25/08* (2013.01); *B65G 43/10* (2013.01); *B65G 47/763* (2013.01); *B65G 47/914* (2013.01)

(58) Field of Classification Search
 CPC ........ B65G 25/00; B65G 25/02; B65G 25/08; B65G 25/10; B65G 25/12; B65B 43/46; B65B 43/54
 USPC ......................................................... 198/747
 See application file for complete search history.

(56) References Cited

U.S. PATENT DOCUMENTS

| | | | |
|---|---|---|---|
| 5,078,570 A * | 1/1992 | Loock | B23Q 7/003 198/468.2 |
| 7,507,087 B2 * | 3/2009 | Tenzek | F27B 9/028 198/747 |
| 8,893,873 B1 * | 11/2014 | Harris | B65G 19/00 198/345.1 |
| 2013/0105036 A1 | 5/2013 | Smith et al. | |
| 2014/0178168 A1 * | 6/2014 | Wang | B65G 47/907 414/749.6 |
| 2015/0013277 A1 | 1/2015 | Brandhorst et al. | |

FOREIGN PATENT DOCUMENTS

| | | |
|---|---|---|
| NL | 7711921 | 5/1978 |
| WO | 0023321 | 4/2000 |
| WO | 2011144867 | 11/2011 |

\* cited by examiner

CONVEYING DEVICE

BACKGROUND OF THE INVENTION

A conveying device having at least one transport unit for transporting packaging blanks and/or containers in a transport direction along a transport path, the transport unit comprising at least one conveying element which is drivable along a part section of the transport path, has already been proposed.

SUMMARY OF THE INVENTION

The invention proceeds from such a conveying device.

It is proposed is that at least one conveying element comprises a rear side, which is provided in at least one operating state for the purpose of pulling packaging blanks and/or containers in the transport direction, and a front side which is provided in at least one operating state for the purpose of pushing packaging blanks and/or containers in the transport direction. A 'packaging blank' is to be understood in this context in particular as a material blank which is provided for producing a packaging. In particular, the packaging blank can be realized as a carton blank for producing a cardboard box and/or can be formed at least predominantly from a carton material. The packaging blank can be a flat, non-folded blank and/or an upright blank. An 'upright blank' is to be understood in this context in particular as a packaging blank which already comprises a three-dimensional folding of a container which is to be formed from the packaging blank and which has not yet been joined by means of bonding and/or insertion of tabs or similar suitable joining techniques at its open sides and/or edges to form a container. A 'container' is to be understood in this context in particular as a packaging container that is formed from the packaging blank. In particular, the container can comprise at least five closed sides. In a preferred manner, the container can comprise on at least one side a closable opening which is provided for the purpose of making it possible to fill a product into the container. A 'transport direction' is to be understood in this context in particular as a direction of a transport along the transport path from a transfer point at which the packaging blanks and/or containers are transferred to the conveying device, up to a discharge point at which the conveying device discharges the packaging blanks and/or container to a subsequent device. A 'conveying element' is to be understood in this context in particular as an element which is provided for the purpose of exerting onto packaging blanks and/or containers a force which brings about a transport of the packaging blanks and/or containers. In particular, the force can act at least substantially in the transport direction. A 'rear side' is to be understood in this context in particular as a side of the conveying element which is aligned at least substantially in opposition to the transport direction and/or points at least substantially in the direction of the transfer point of the conveying device. A 'front side' is to be understood in this context in particular as a side of the conveying element which is aligned at least substantially in the transport direction and/or points at least substantially in the direction of the discharge point of the conveying device. 'At least substantially' is to be understood in this context in particular as a deviation from a mean surface normal of the front or rear side of less than 45°, in a preferred manner of less than 30°, in a particularly preferred manner of less than 15°. 'Pull' is to be understood in this context in particular as a transport by means of a pulling force. 'Push' is to be understood in this context in particular as a transport by means of a pushing force. In particular, it can be possible in the case of a pushing transport that the conveying element pushes several containers and/or packaging blanks that are arranged one behind another by means of the pushing force. An 'operating state' is to be understood in this context in particular as a state which brings about a transport of packaging blanks and/or containers at least during the part section of the transport path. In an advantageous manner, the conveying element can transport packaging blanks and/or containers which, relative to the transport direction, are arranged in front of and/or behind the conveying element. The conveying element can be particularly versatile. A number of conveying elements required for a transport task is able to be reduced. The transport unit can comprise further conveying elements which are provided only for pulling transport by way of a rear side or pushing transport by way of a front side. Conveying elements which are provided for transport tasks where pulling and pushing is not necessary are able to be constructed in a particularly simple manner.

It is further proposed that the conveying element is provided for the purpose of introducing the packaging blanks and/or containers into at least one working station which is arranged along the transport path and/or adjoins the transport path and/or of removing them out of the at least one working station. 'Working stations' are to be understood in this context in particular as devices which are provided for the purpose of carrying out at least one operation on the packaging blanks and/or containers. In particular, working stations can be realized as erecters and/or loaders and/or closers. An 'erecter' is to be understood in this context in particular as a device which is provided for the purpose of erecting, i.e. forming, a container from a packaging blank. A 'loader' is to be understood in this context in particular as a device which is provided for the purpose of inserting products and/or information material and/or aids into the container. A 'closer' is to be understood in this context in particular as a device which is provided for the purpose of closing the container which in a preferred manner has been filled with products. Working stations can also be provided for the purpose of labeling and/or marking packaging blanks and/or containers and/or of applying adhesives and/or further additives to packaging blanks and/or containers and/or of carrying out assembly steps. Working stations can also be realized as storage stations and/or can include storage stations. A 'storage station' is to be understood in this context as a device which is provided for the purpose of receiving, intermediately storing and discharging again at least one packaging blank and/or container or, in a preferred manner, a plurality of packaging blanks and/or containers. A 'working station adjoining the transport path' is to be understood in this context in particular as a working station and/or a machine which adjoins the transport path and which is arranged in front of or after the transport path of the conveying device. The conveying element is able to take over packaging blanks or containers from the adjoining working station and/or discharge them to the adjoining working station. A product flow of the conveying device can be linked to further working stations and/or machines. It can also be possible for the conveying element to be provided for the purpose of transporting, in particular pushing, a plurality of packaging blanks and/or containers which have been stored intermediately in a storage station together in the transport direction to a further working station. In a preferred manner, the conveying element is provided for the purpose of pushing and/or pulling the packaging blanks and/or containers into the working stations and/or of pulling and/or pushing the packaging blanks and/or containers out of the working stations. The conveying element is able to transport the packaging blanks and/or containers efficiently from one working station to a next working station. The conveying device can be especially suitable to transport packaging blanks and/or containers with different dimensions in a particularly flexible manner between working stations. In particular, different containers can be produced and/or filled and transported with conveying device as a result of the erecters, loaders and closers. Necessary mechanical changeovers on the conveying device can be particularly simple or in a preferred manner omitted.

Further proposed is a control unit which is provided for the purpose of synchronizing, in at least one operating state, a transport movement of the conveying element for forming a working movement with the at least one working station. A 'control unit' is to be understood in this context as a mechanical and/or in a preferred manner electric and/or electronic unit which is provided for the purpose of controlling and/or regulating a movement profile and/or speed profile of the conveying element. The control unit can include mechanical control means and/or linkages. In a preferred manner, the control unit can include means for controlling and/or regulating a drive unit which is provided for the purpose of driving the conveying element along the transport path. A 'working movement' is to be understood in this context in particular as a movement which is provided for the purpose of carrying out and/or supporting an operation of the working station on the container and/or packaging blank. The working movement can be formed in particular by a relative movement between the working station and/or a tool of the working station, on the one hand, and the container and/or packaging blank that is moved by way of the transport movement of the conveying element on the other hand. 'Synchronizing' the transport movement with the working movement is to be understood in this context in particular as the transport movement being controlled and/or regulated in such a manner that the resulting working movement is formed between the container and/or the packaging blank and the working station and/or the tool of the working station. In particular, the conveying element can be provided for the purpose of driving the packaging blanks and/or containers in the transport direction by way of a movement component of the working movement and/or of discharging the packaging blanks and/or containers to the working station or of removing them from working station during the working movement. The working station can carry out further movement components of the working movement. For operations where the working movement comprises exclusively movement components perpendicular to the transport direction, the transport movement of the conveying element can be synchronized with the working station such that said conveying element stops in the transport direction relative to the working station. The packaging blanks and/or containers are able to be moved continuously in and between the working stations. The transport movement can form at least one movement component of the working movements of the working stations. Speed jumps can be avoided and/or acceleration of the packaging blanks and/or containers can be low. The conveying device can transport the packaging blanks and/or containers in a particularly gentle manner. The packaging blanks and/or containers are able to be conveyed at a particularly fast speed. The conveying device and/or a packaging machine provided with the conveying device can be particularly efficient.

In an advantageous development of the invention, the at least one conveying element is provided in at least one operating state for the purpose of simultaneously pulling at least one of the packaging blanks and/or containers by way of its rear side and pushing at least one of the further packaging blanks and/or containers by way of its front side. In particular, the conveying element can push a packaging blank and/or container out of a working station by way of its front side and, by way of the identical transport movement, pull a following packaging blank and/or container in opposition to the transport direction into the working station. Further, advantageous operations are also conceivable in which a conveying element pulls and pushes packaging blanks and/or containers at the same time. The conveying element is able to fulfill several transport tasks at the same time. The conveying device is able to be particularly efficient and/or compact.

Further proposed are forming and/or guiding means which are mounted along at least one part section of the transport path and are provided for the purpose of forming and/or guiding packaging blanks and/or containers. In order to support the packaging blanks and/or containers along the transport path against a weight force, a bottom and/or strip can extend at least in part along the transport path. Supporting a weight force of the packaging blanks and/or containers by the conveying element can be omitted. In addition, side guides can extend along the transport path which are provided for the purpose of forming a positive-locking fit with the packaging blanks and/or containers in order to prevent or at least limit the packing blanks and/or containers deflecting transversely to the transport direction and the weight force. In addition, guides, in particular guide plates and/or guide rails, can be provided for the purpose of guiding edges of the packaging blanks and/or containers and moving them into a desired position and/or holding them in a desired position. In particular, guide plates and/or guide rails are able to guide edges of tabs and/or lid parts of the containers such that openings of the container are accessible and it is easier to insert packing goods into the containers. The guide plates and/or guide rails can form an insert aid for packing goods designated as a 'shoe horn' by keeping openings in the container accessible and/or centering the packing goods with reference to the openings. The insert aids can also be movably mounted and/or driven in order to move tabs of the container in an opening movement such that the opening of the container is further enlarged and/or the insertion of packing goods is further facilitated. The guide plates and/or guide rails can be arranged in particular on part sections of the transport path between working stations and/or in the region of working stations. The forming and/or guiding means are able to support the transport of packaging blanks and/or containers in an efficient manner. The forming and/or guiding means can facilitate operations of the working stations.

In a preferred development of the invention, it is proposed that the at least one conveying element is provided for the purpose of forming the containers from the packaging blanks and/or of closing the containers during transport along a part section of the transport path under the influence of the forming and/or guiding means. In particular, forming and/or guiding means can be arranged in such a manner between a first working station which is realized as a carton hopper and a further working station that, during transport of the packaging blanks, the packaging blanks are erected to form open containers under the influence of the transport movement. In addition, forming and/or guiding means which close tabs and/or lid parts of the containers under the influence of the transport movement, can be arranged in the region of a part section after the containers have been filled with packing goods. In particular, the forming and/or closing of the containers can be effected in a continuous movement. Transport sections, in particular between working stations, can be utilized in an efficient manner for processing packaging blanks and/or containers. Further driven aids for forming and/or closing containers can be omitted.

It is further proposed that the rear side of the at least one conveying element comprises at least one holding element which is provided for the purpose of exerting a pulling force on packaging blanks and/or containers to be pulled. The holding element can be realized as a gripper. In a preferred manner, the holding element comprises one or several suction openings. A 'suction opening' is to be understood in this context in particular as an opening which can be acted upon with a negative pressure in relation to a surrounding pressure of the conveying element. Packaging blanks and/or containers can be sucked in by the suction opening and held by a holding force which is caused by the negative pressure. In a preferred manner, the suction openings can comprise sealing lips, in particular produced from an elastic material. In addition, touch valves can be provided which connect the suction openings to a negative pressure source on contact with the packaging blanks and/or containers. It is also possible for the suction openings to be opened only along part sections of the transport path in which a pulling force is necessary between the conveying element and the packaging blanks and/or containers. Air consumption of the suction openings is able to be reduced. The conveying element is able to transport the packaging blanks and/or containers effectively in a pulling manner. In addition, on its front and/or rear side the conveying element can comprise guide means which are provided for the purpose of enclosing the packaging blanks and/or containers at least in part in the direction of or in opposition to the transport direction. The guide means can be suitable to center the packaging blanks and/or containers with reference to the conveying means.

It is further proposed that the at least one conveying element is provided in at least one operating state for the purpose of pushing packaging blanks and/or containers by way of its rear side and/or of pulling them by way of its front side in opposition to the transport direction. In particular, one or several holding elements can be provided for this purpose on the front side of the conveying element. The conveying element is able to exert and/or support a working movement of working stations which comprises a movement component in opposition to the transport direction. The conveying device is able to transport the packaging blanks and/or containers in a particularly flexible manner.

Further proposed is a bearing unit which is provided for the purpose of mounting the at least one conveying element on a guide unit of the transport unit so as to be able to be folded away from and/or pulled back to an operating region for return transport of the conveying element in opposition to the transport direction. A 'guide unit' is to be understood in this context in particular as a linear guide unit of the transport unit which is provided for the purpose of mounting the conveying element so as to be drivable in the transport direction. A 'working region' is to be understood in this context in particular as a region along the transport path through which the packaging blanks and/or containers are transported and/or in which forming and/or guiding means and devices of working stations are arranged. The conveying element can be moved back without collision in opposition to the transport direction in order to take over a next packaging blank and/or container and transport it in the transport direction. As an alternative to this, it can be possible for the transport element to be arranged on a circumferential guide system, a return section also being arranged outside the working region. In addition, the conveying element can comprise one or several sensors which are provided for the purpose of detecting packaging blanks and/or containers in the working region during transport and/or return transport. This can be effected at a standstill and/or during the transport movement and/or return transport movement. A number and/or position of packaging blanks and/or containers in the working region can be controlled. Faults are able to be detected. A correct arrangement of packaging blanks and/or containers can be monitored.

Particularly advantageous is a plurality of transport units which are arranged in series along the transport path and/or parallel to the transport path. Arranged 'in series' is to be understood in this context in particular as several transport units being arranged one after another in the transport direction. A 'parallel' arrangement is to be understood in this context in particular as several transport units each comprising at least one conveying element which is drivable at least along an identical part section of the transport path. In a preferred manner, several transport units are arranged in series such that one conveying element of a transport unit is able to introduce packaging blanks and/or containers into a working station and one conveying element of a transport unit following in the transport direction is able to remove packaging blanks and/or containers from said working station and forward them. In an advantageous manner, several packaging blanks and/or containers are able to be transported at the same time one behind another along the transport path. The packaging blanks and/or containers are able to be moved in each case into the work stations and removed from the working stations by a conveying element in a synchronous manner with a working movement and/or a working pulse. It can be possible to drive the packaging blanks and/or containers independently along the part sections of the transport path covered by transport units which are arranged in series and to synchronize them with working movements and/or working pulses of working stations. If, in the case of a parallel arrangement, several transport units comprise conveying elements which are drivable at least along an identical part section of the transport path, it can be possible to drive the packaging blanks and/or containers independently along said part section and to synchronize them with working movements and/or working pulses of working stations. It is also possible for a transport unit to comprise several conveying elements. In a preferred manner, the conveyor elements can be independently drivable, for example as a result of several, independently realized belt drives and/or linear drives. The conveying elements can drive the packaging blanks and/or containers independently along the transport unit and synchronize them with working movements and/or working pulses of working stations. Advantages of a series and of a parallel arrangement of transport units can be combined. A plurality of packaging blanks and/or containers can be transported along a transport path to a plurality of working stations, the packaging blanks and/or containers being in each case drivable and/or synchronizable independently along the transport path.

Further proposed is a method for transporting packaging blanks and/or containers by way of a conveying device according to the invention. In particular, the method can include that one or several conveying elements in each case transport one or several packaging blanks and/or containers in a pulling manner by way of their rear side and/or in a pushing manner by way of their front side along a transport path between working stations.

In a preferred manner, a packaging machine, in particular a cartoning machine, is provided with a conveying device according to the invention. In a preferred manner, the packaging machine comprises a plurality of working stations. Packaging blanks and/or containers are able to be transported in a particularly efficient manner along the working stations. The packaging machine is able to be particularly efficient.

In this connection, the conveying device according to the invention is not to be limited to the above-described application and embodiment. In particular, the conveying device according to the invention, for fulfilling a method of operation described herein, can comprise a number which deviates from a number of individual elements, components and units named herein.

BRIEF DESCRIPTION OF THE DRAWINGS

Further advantages are produced from the following description of the drawing. Exemplary embodiments of the invention are shown in the drawings. The drawings, the description and the claims include numerous features in combination. The expert will also look at the features individually in an expedient manner and combine them to form useful further combinations.

The drawings are as follows.

DETAILED DESCRIPTION

Figure 1:
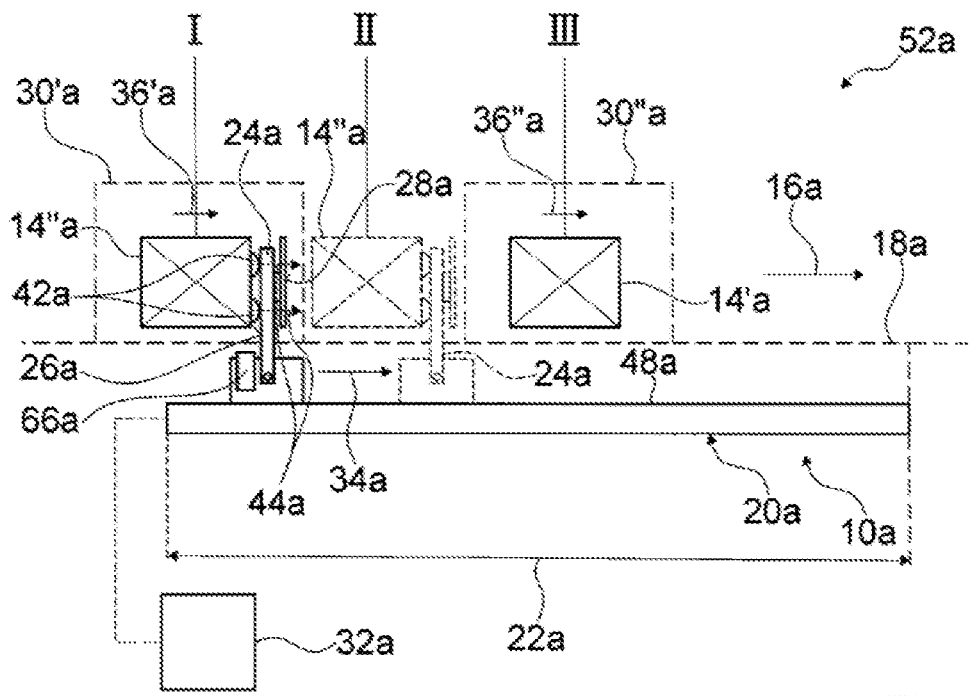
FIG. 1 shows a schematic representation of a cutout of a packaging machine having a conveying device according to the invention with a conveying element which pulls a container in a transport direction.
Figure 4:
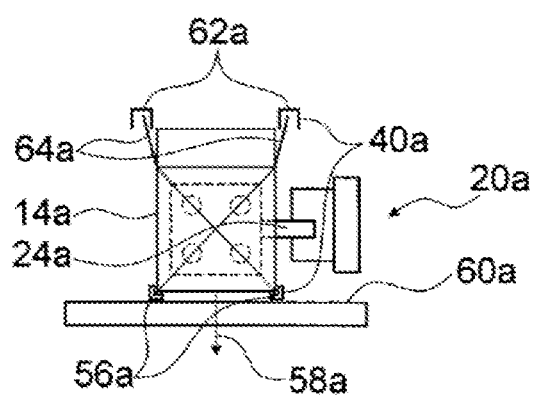
FIG. 4 shows a schematic representation of a section through the conveying device with forming and guiding means.

FIG. 1 shows a cutout of a top view of a packaging machine 52a having a conveying device 10a with a transport unit 20a for transporting containers 14a (FIG. 4) in a transport direction 16a along a transport path 18a, the transport unit comprising a conveying element 24a which is drivable along a part section 22a of the transport path 18a. The conveying element 24a comprises a rear side 26a which is provided in one operating state for the purpose of pulling containers 14a in the transport direction 16a. The conveying element 24a further comprises a front side 28a which is provided in one operating state for the purpose of pushing the containers 14a in the transport direction 16a. FIG. 1 shows a first container 14'a and a second container 14"a in two transport stages. In the example the conveying element 24a pushes or pulls in each case one of the containers 14'a, 14"a. It is also possible for the conveying element 24a to be provided for the purpose of pulling and/or pushing several containers 14a arranged side by side and/or pushing several containers 14a arranged one behind another in the transport direction 16a. Two working stations 30'a, 30"a, which each carry out an operation on the containers 14'a, 14"a, such as inserting products into the respective container 14'a, 14"a, are arranged along the transport path 18a. The conveying element 24a is provided for the purpose of introducing the containers 14'a, 14"a into the working stations 30'a, 30"a which are arranged along the transport path 18a and removing them from the working stations 30'a, 30"a. A control unit 32a is provided for the purpose of synchronizing in one operating state a transport movement 34a of the conveying element 24a for forming the working movements 36'a, 36"a with the working stations 30'a, 30"a. To this end, the control unit 32a controls a drive unit (not shown in any more detail) of the conveying element 24a of the transport unit 20a such that the transport movement 34a forms a speed component of the working movements 36'a, 36"a of the working stations 30'a, 30"a. Speed profiles of the transport movement 34a can be adapted corresponding to the transport task and/or to the requirements of the working stations 30'a, 30"a.

FIG. 1 shows a first transport step. The conveying element 24a pulls the second container 14"a, when seen in opposition to the transport direction 16a, from a position I out of the working station 30'a into a region between the two working stations 30'a and 30"a to a position II. The first container 14'a is already situated in the second working station 30"a. The takeover of the container 14"a in the position I is effected synchronously with the working movement 36'a of the working station 30'a. The rear side 26a of the conveying element 24a facing the transport direction 16a comprises holding elements 42a which are provided for the purpose of exerting a pulling force 44a on the containers 14"a to be pulled. The holding elements 42a are realized as suction cups which are acted upon with negative pressure by means of a negative pressure source (not shown in any detail) and a pressure line.

Figure 2:
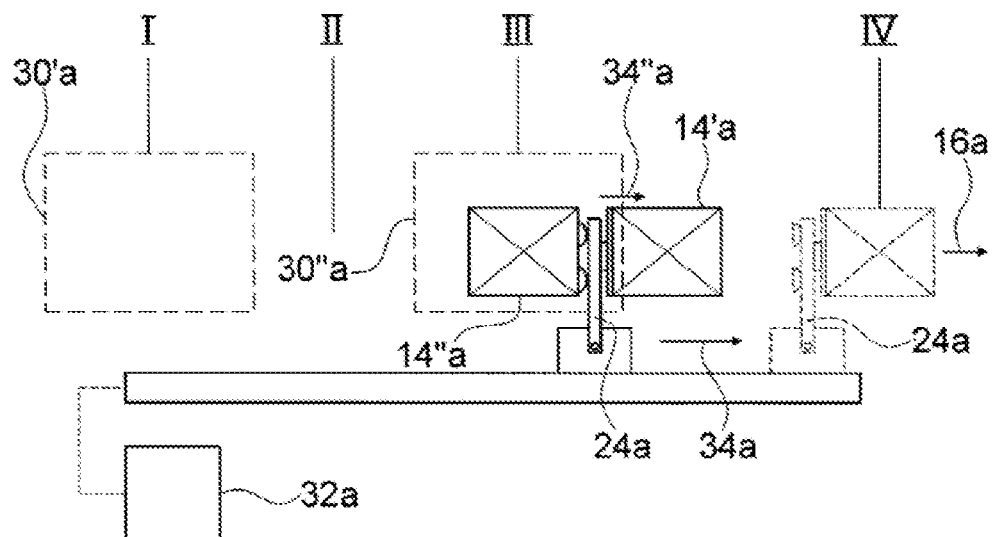
FIG. 2 shows a schematic representation of the conveying device with the transport element which pulls a container into a working station and pushes a further container out of the working station.

In a second transport step shown in FIG. 2, the conveying element 24a, in a position III, simultaneously pulls the container 14"a by way of its rear side 26a into the working station 30"a and in the same transport movement 34a pushes the container 14'a out of the working station 30"a. To this end, a speed of the transport movement 34a is initially reduced to a slowed transport movement 34"a such that the container 14'a is contacted at a slower speed and a hard impact of the conveying element 24a onto the container 14'a is avoided. The speed of the transport movement 34a is then increased again in order to move the container 14'a further in the transport direction 16a. The container 14"a is simultaneously pulled further into the working station 30"a until it has reached the position III. A pressure in the holding element 42a is then adjusted to a surrounding pressure by ventilating the suction cups such that the pulling force 44a is increased and the container 14"a remains in position III. In order to lock the container 14"a in position III, further means (not shown here) can be provided, such as, for example, suction cups, vacuum plates and/or movable stop means. As a result, the conveying element 24a pushes the container 14'a further into a position IV.

Figure 3:
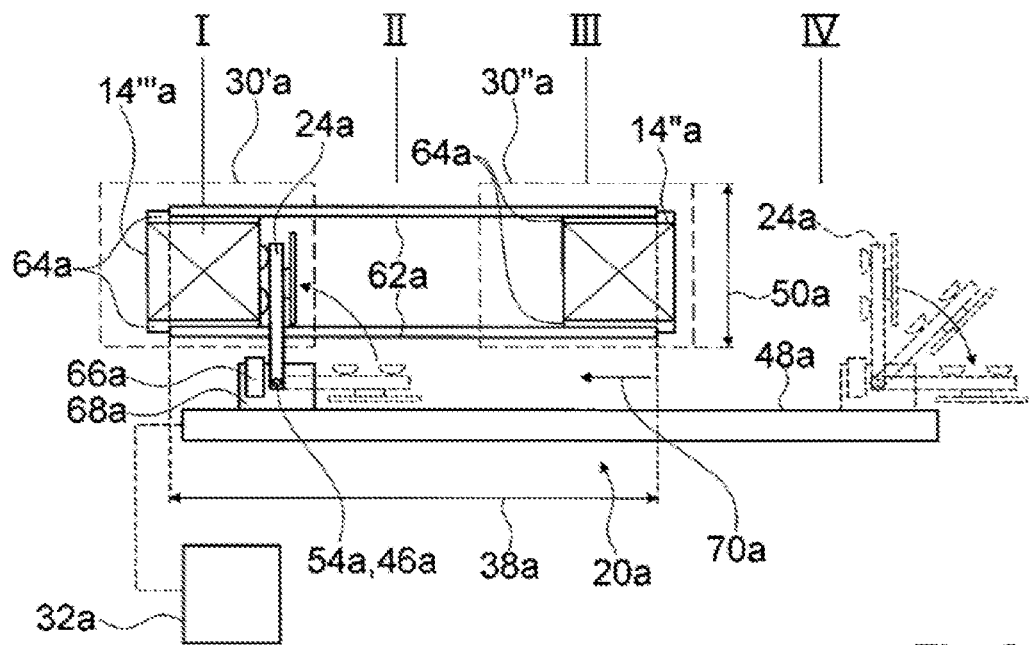
FIG. 3 shows a schematic representation of the conveying device with the conveying element being transported back.

The conveying element 24a is arranged with a bearing unit 46a on a guide unit 48a of the transport unit 20a, the bearing unit being provided for the purpose of mounting the conveying element 24a so as to be able to be folded away out of a working region 50a in opposition to the transport direction 16a (FIG. 3). The bearing unit 46a mounts the conveying element 24a so as to be movable about a pivot axis 54a on a carriage 68a of the transport unit 20a which is drivable in and in opposition to the transport direction 16a. The conveying element 24a comprises a sensor 66a which is provided for the purpose of detecting containers 14a which are situated in the working region 50a. Containers 14a are detected in the working region during forward and return transport by means of the sensor 66a. A number and/or position of containers 14a in the working region 50a is controlled. FIG. 3 shows a transport step which follows FIG. 2. Proceeding from the position IV, the container 14'a has been taken over and forwarded by a further transport system of an adjoining machine which adjoins the transport path 18a, not shown here in any detail. The conveying element 24a is folded about the pivot axis 54a of the bearing unit 46a in the transport direction 16a, in a return transport movement 70a moved back into position I and repositioned about the pivot axis 54a in order to take over a further container 14'a waiting in the working station 30'a. The container 14'''a is then moved into the position III to the working station 30''a and the container 14''a into the position IV corresponding to the transport step shown in FIG. 2. Said transport steps are repeated for as long as new containers 14a are delivered.

Forming and guiding means 40a, which are provided for the purpose of forming and guiding packaging blanks to produce containers 14a (FIG. 4), are mounted along a part section 38a of the transport path 18a. The part section 38a extends from the working station 30'a to the working station 30''a. Side guides 56a surround edges of the container 14a which are parallel to the transport direction 16a and prevent the container 14a from deflecting laterally perpendicular to a force of gravity 58a and to the transport direction 16a. A bottom 60a supports the container 14a against the gravitational force 58a. Two lid tab guides 62a are realized as U-shaped guides and guide two lid tabs 64a of the container 14a which are parallel to the transport direction 16a. The lid tab guides 62a prevent the lid tabs 64a tilting in the direction of the container center and thus closing the opening of the container 14a. The filling of packing goods into the container 14a in the working stations 30'a, 30''a is made easier in this manner.

The following description and the drawings of two further exemplary embodiments are limited essentially to the differences between the exemplary embodiments, reference also being possible in principle to the drawings and/or the description of the other exemplary embodiments with reference to identically designated components, in particular with reference to components with identical references. To differentiate between the exemplary embodiments, the letters b and c follow the further exemplary embodiments in place of the letter a of the first exemplary embodiment.

Figure 5:
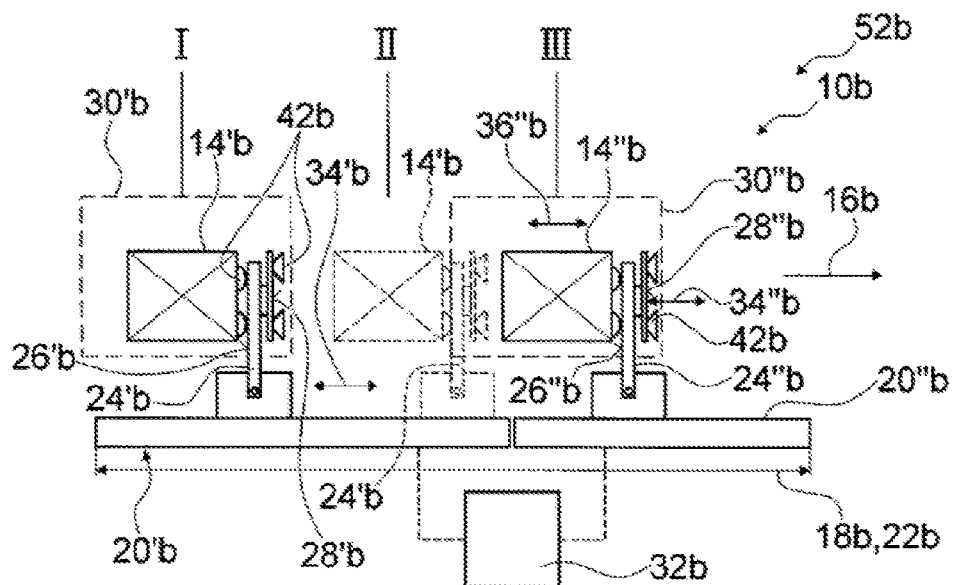
FIG. 5 shows a schematic representation of a second exemplary embodiment of a conveying device with a further transport unit that is arranged in series and FIG. 6 shows a schematic representation of a cutout of a packaging machine having a third exemplary embodiment of a conveying device according to the invention with two transport units arranged in parallel.

FIG. 5 shows a cutout of a packaging machine 52b with a conveying device 10b for transporting containers 14'b, 14''b in a transport direction 16b along a transport path 18b, in a second exemplary embodiment.

The conveying device 10b of the second exemplary embodiment differs from the conveying device 10a of the first exemplary embodiment in particular in that a further transport unit 20''b with a further conveying element 24''b is arranged in series along a part section 22b of the transport path 18b (FIG. 5). A first container 14'b is pulled by a conveying element 24'b of a first transport unit 20'b from a position I in a first working station 30'b to a position II in the transport direction 16b in front of a second working station 30''b. The container 14''b, which, when the container 14'b is transported into the position II, is pushed in the direction of a position III into the second working station 30''b by the conveying element 24'b by way of its front side 28'b, was at this moment already situated in the position II. The container is taken over by the conveying element 24''b of the second transport unit 20''b at the position III. In a next step, the second transport unit 20''b transports the container 14''b out of the second working station 30''b and further in the transport direction 16b. The conveying element 24'b of the first transport unit 20'b is at this time already able to transport a next container (not shown here) in the region of the positions I and II. Transport movements 34'b and 34''b of the first and of the second transport unit 20'b, 20''b are independent of one another and are controlled by a common control unit 32b. In addition, the conveying elements 24'b, 24''b are provided for the purpose, in one operating state, of pushing the containers 14'b, 14''b by way of their rear side 26'b, 26''b and pulling them by way of their front side 28'b, 28''b in opposition to the transport direction 16b. Holding elements 42b, which are also realized as suction cups, are arranged on the front sides 28'b, 28''b for this purpose. The containers 14'b, 14''b are consequently able to be moved by both conveying elements 24'b, 24''b in a pulling manner and in a pushing manner in the region of the working stations 30''b with transport movements 34b on both sides which bring about an alternating working movement 36''b of the working station 30''b. The working station 30''b deposits products in several rows and layers in the containers 14'b, 14''b. The containers 14'b, 14''b are moved to and fro in the alternating working movement 36''b to form the rows whilst the working station 30''b deposits products. In a further operating mode not shown in the figure, the conveying element 24'b, by way of its front side 28'b, pushes containers, not shown here, from position I to position III. In a further operating mode, the conveying element 24''b can transport in a pushing manner, also by way of its front side 28''b, containers, not shown here, which are situated behind the conveying element 24''b in the transport direction 34b.

Figure 6:
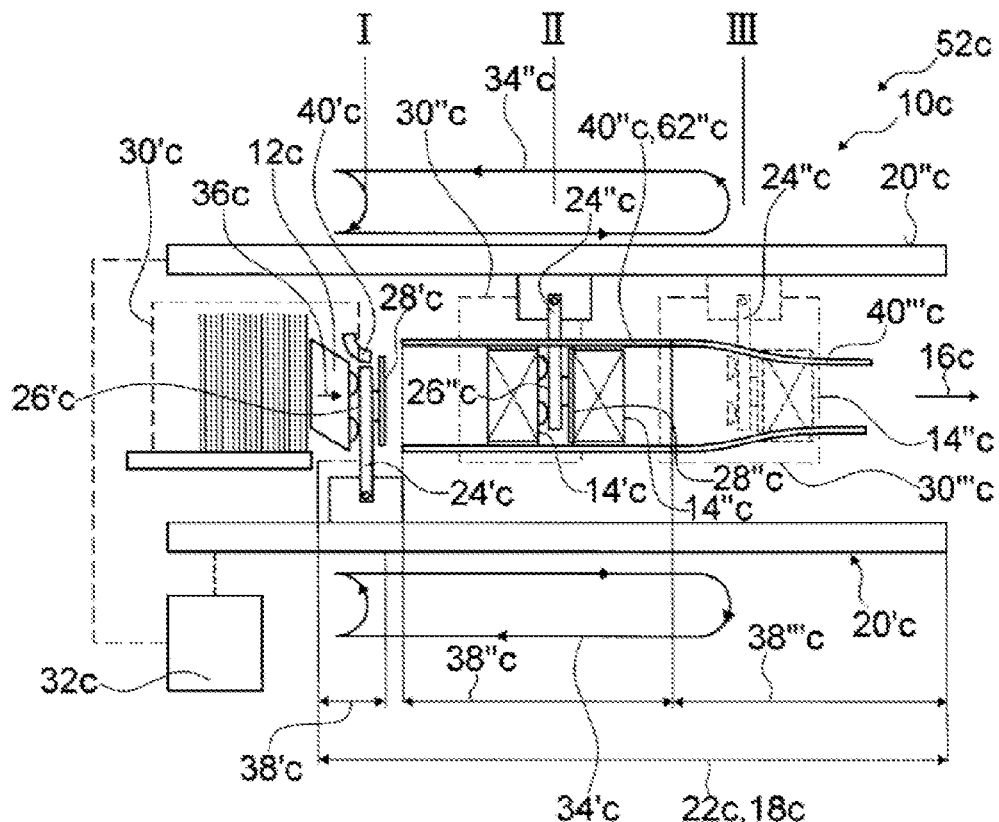

FIG. 6 shows a cutout of a packaging machine 52c with a conveying device 10c for transporting packaging blanks 12c and containers 14'c, 14''c in a transport direction 16c along a transport path 18c, in a third exemplary embodiment.

The conveying device 10c of the third exemplary embodiment differs from the first exemplary embodiment in particular in that two transport units 20'c, 20''c each with one conveying element 24'c, 24''c are arranged along a part section 22c parallel to the transport path 18c. The transport units 20'c, 20''c are controlled by a common control unit 32c and are moved to and fro along the transport path 18c by way of the transport movements 34'c, 34''c. In a position 1, the conveying elements 24'c, 24''c, in each case in an alternating manner, pull packaging blanks 12c, which are realized as folding box blanks, out of a first working station 30'c, which is realized as a carton hopper, and transport them to working stations 30''c, 30'''c in order to fill and close the containers 14'c, 14''c. FIG. 6 shows as an example how the conveying element 24'c pulls off a packaging blank 12c. Forming and guiding means 40'c, which cause the packaging blank 12c, during a transport movement 34'c transferred by the conveying element 24'c onto the packaging blank 12c, to be set upright to form a container not shown in the process step in FIG. 6, are arranged along a part section 38'c of the part section 22c. The forming and guiding means 40'c are part of the working station 30'c. The transport movement 34'c brings about a relative movement between the forming and guiding means 40'c and consequently a working movement 36c which sets the packaging blank upright. During or after it has been set upright, bottom tabs of the packaging blank 12c are provided by means of an adhesive dosing system, which is not shown here in any more detail, with adhesive, such as, for example, hot glue, and are folded. As an alternative to this, an adhesive tape can be applied in order to bond the bottom tabs. As a result of bonding the bottom tabs, the container realized as a folding box is formed from the packaging blank 12c. The containers 14'c, 14"c shown in FIG. 6 have been formed in a corresponding manner. A maximum speed of the transport movement 34'c when forming the container is limited by the process forming the container as well as by necessary setting and/or cooling times for the adhesive. The conveying element 24'c as a result pulls the container formed from the packaging blank 12c along the transport path 18c into a position II where said container is filled by the working station 30"c. FIG. 6 further shows how the conveying element 24"c carries out a transport step from the position II into a position III. The conveying element 24" which has just pulled the container 14'c to the position II is shown in the position II. The container 14"c, which has already been pulled by the conveying element 24'c into the position II in a preceding process step and has been filled by the working station 30"c, is situated in the transport direction 16c next to the conveying element 24"c. The conveying element 24"c then leaves the container 14'c at the position II, such that it can be filled as a result, and pushes the container 14"c to the position III. In a following process step, the conveying element 24'c will push the container 14'c in a corresponding manner into the position III. Forming and guiding means 40"c, which are realized as lid tab guides 62"c and hold the containers 14'c, 14"c open for filling in the region of the working station 30"c, are arranged along a part section 38"c. Along the transport path 18c, a further working station 30"c connects to the working station 30"c in the position III. Said further working station comprises along a part section 38"c further forming and guiding means 40'c which are provided for the purpose of closing the containers 14'c, 14"c during the transport along the part section 38"c of the transport path 18c. This is effected when the containers 14'c, 14"c are pushed from the position II to the position III and beyond. The forming and guiding means 40"c are formed in such a manner that, during the transport along the part section 38"c, they fold lid tabs of the containers 14'c, 14"c in the direction of a container center and thus close the containers 14'c, 14"c. The containers 14'c, 14"c are transported away at the end of the transport path 18c by further conveying elements that are not shown here. The two conveying elements 24'c, 24"c execute the described movement sequence in an alternating manner and in an alternating manner fetch a packaging blank 12c out of the working station 30'c and transport it along the part section 22c of the transport path 18c. A number of containers 14'c, 14"c which can be formed from the packaging blanks 12c during a period of time is able to be doubled in this way by using two conveying elements 24c.

What is claimed is:

1. A conveying device having a plurality of transport units (20a, 20'b-c, 20"b-c) each for transporting objects in a transport direction (16a-c) along a transport path (18a-c), wherein the plurality of transport units (20a, 20'b-c, 20"b-c) are arranged in series along or parallel to the transport path (18b, 18c), wherein the objects are at least one of packaging blanks (12c) and containers (14a, 14'a-c, 14"a-c, 14'''a), wherein each of the plurality of transport units comprises a conveying element (24a, 24'b-c, 24"b-c) which is drivable along a part section (22a-c) of the transport path (18a-c), characterized in that the conveying element (24a, 24'b-c, 24"b-c) comprises a rear side (26a, 26'b-c, 26"b-c) including a holding element (42a-b), which, in an operating state, pulls one of the objects in the transport direction (16a-c) via a pulling force (44a) exerted by the holding element (42a-b), and a front side (28a, 28'b-c, 28"'b-c) which, in the operating state, pushes a further one of the objects in the transport direction (16a-c), and wherein the conveying element (24a, 24'b-c, 24"b-c), in the operating state, simultaneously pulls the one of the objects by the rear side (26a, 26'b-c, 26"b-c) and pushes the further one of the objects by the front side (28a, 28'b-c, 28"'b-c).

2. The conveying device as claimed in claim 1, characterized in that the conveying element (24a, 24'b-c, 24"b-c) is configured for introducing the objects into at least one working station (30'a-c, 30"a-c, 30'''c) which is arranged along the transport path (18a-c) and/or adjoins the transport path (18a-c).

3. The conveying device as claimed in claim 2, characterized by a control unit (32a-c) configured to synchronize, in the operating state, a transport movement (34a-b, 34'b-c, 34"a, 34"c) of the conveying element (24a, 24'b-c, 24"b-c) for forming a working movement (36'a, 36"a-b, 36c) with the at least one working station (30'a-c, 30"a-c, 30'''c).

4. The conveying device as claimed in claim 1, characterized by forming and guiding means (40a, 40'c, 40"c, 40'c) which are mounted along at least a part section (38a, 38'c, 38"c, 38"'c) of the transport path (18a, 18c) and are configured for forming and guiding objects.

5. The conveying device as claimed in claim 4, characterized in that the at least one conveying element (24'c, 24"c) is configured for forming containers (14'c, 14"c) from packaging blanks (12c) and for closing containers (14'c, 14"c) during transport along the part section (38'c, 38"'c) of the transport path (18c) under the influence of the forming and guiding means (40'c, 40"'c).

6. The conveying device as claimed in claim 1, characterized in that the conveying element (24'b, 24"b), in the operating state pushes an object by the rear side (26'b, 26"b) and simultaneously pulls a further object by the front side (28'b, 28"b) in a direction opposite to the transport direction (16b).

7. The conveying device as claimed in claim 1, characterized by a bearing unit (46a) which is configured for mounting the conveying element (24a, 24'b-c, 24"b-c) on a guide unit (48a) of the transport unit (20a, 20'b-c, 20"b-c) so as to be able to be folded away out of an operating region (50a) for return transport of the conveying element (24a, 24'b-c, 24"b-c) in a direction opposite to the transportation direction (16a-c) and so as to be able to be pulled back.

8. A packaging machine (52a-c) having a conveying device (10a-c) as claimed in claim 1.

9. The conveying device as claimed in claim 1, characterized in that the conveying element (24a, 24'b-c, 24"b-c) is configured for removing objects out of the at least one working station (30'a-c, 30"a-c, 30'''c).

10. The conveying device as claimed in claim 9, characterized in that the conveying element (24a, 24'b-c, 24"b-c) is also configured for introducing the objects into at least one working station (30'a-c, 30"a-c, 30'''c) which is arranged along the transport path (18a-c) and/or adjoins the transport path (18a-c).

11. The conveying device as claimed in claim 10, characterized by a control unit (32a-c) configured to synchronize, in the operating state, a transport movement (34a-b, 34'b-c, 34"a, 34"c) of the conveying element (24a, 24'b-c, 24"b-c) for forming a working movement (36'a, 36"a-b, 36c) with the at least one working station (30'a-c, 30"a-c, 30'''c).

12. The conveying device as claimed in claim 1, wherein the plurality of transport units (20a, 20'b-c, 20"b-c) are arranged in series along the transport path (18b).

13. The conveying device as claimed in claim 1, wherein the plurality of transport units (20a, 20'b-c, 20"b-c) are arranged parallel to the transport path (18c).

14. A method for transporting objects by a conveying device (10a-c), the method comprising:
transporting the objects in a transport direction (16a-c) via a plurality of transport units (20a, 20'b-c, 20"b-c), wherein the plurality of transport units are arranged in series along or parallel to a transport path (18b, 18c), wherein the objects are at least one of packaging blanks (12c) and containers (14a, 14'a-c, 14"a-c, 14'''a), wherein the plurality of transport units (20a, 20'b-c, 20"b-c) each include at least one conveying element (24a, 24'b-c, 24"b-c), which is drivable along a part section (22a-c) of the transport path (18b, 18c), and wherein each of the conveying elements (24a, 24'b-c, 24"b-c) include a rear side (26a, 26'b-c, 26"b-c) and a front side (28a, 28'b-c, 28"b-c),
pulling, via the rear side (26a, 26'b-c, 26"b-c) of one of the conveying elements (24a, 24'b-c, 24"b-c), one of the objects in the transport direction (16a-c); and
pushing, via the front side (28a, 28'b-c, 28"b-c) of the one of the conveying elements (24a, 24'b-c, 24"b-c), a further one of the objects in the transport direction (16a-c) at the same time as the pulling of the one of the objects.

15. The method as claimed in claim 14, wherein the plurality of transport units (20a, 20'b-c, 20"b-c) are arranged in series along the transport path (18b).

16. The method as claimed in claim 14, wherein the plurality of transport units (20a, 20'b-c, 20"b-c) are arranged parallel to the transport path (18c).

17. The method as claimed in claim 14, wherein the conveying element (24a), in a position (III) during a transport movement (34a), simultaneously pulls a container (14"a) via the rear side (26a) into a working station (30"a) and, in the same transport movement (34a), pushes a further container (14'a) out of the working station (30"a),
wherein a speed of the transport movement (34a) is initially reduced to a slowed transport movement (34'a) such that the further container (14'a) is contacted at a slower speed and a hard impact of the conveying element (24a) onto the further container (14'a) is avoided, and the speed of the transport movement (34a) is then increased to move the further container (14'a) farther in the transport direction (16a),
wherein the container (14"a) is simultaneously pulled farther into the working station (30"a) until it has reached the position (III), and
wherein a pressure in the holding element (42a) is then adjusted to a surrounding pressure by ventilating suction cups such that a pulling force (44a) is released and the container (14"a) remains in position (III).

18. The method as claimed in claim 14, wherein a first container (14'b) is pulled by a conveying element (24'b) of a first transport unit (20'b) of the plurality of transport units from a position (I) in a first working station (30'b) to a further position (II) in the transport direction (16b) in front of a second working station (30"b),
wherein a further container (14"b), which, when the first container (14'b) is transported into the further position (II), is pushed in the direction of an additional position (III) from the further position (II) into a second working station (30"b) by the conveying element (24'b) of the first transport unit (20'b) by way of the front side (28'b) of the conveying element (24'b),
wherein the further container (14"b) is taken over by a conveying element (24"b) of a second transport unit (20"b) of the plurality of transport units at the additional position (III), and
wherein, in a next step, the second transport unit (20"b) transports the further container (14'b) out of the second working station (30"b) and further in the transport direction (16b).

19. The method as claimed in claim 14, wherein the conveying element (24a) is folded in the transport direction (16a) about a pivot axis (54a) of a bearing unit (46a) of the conveying device (10a), is moved back into a position (I) in a return transport movement (70a), and is unfolded about the pivot axis (54a) to take over a further container (14'''a) waiting in a working station (30'a), and
wherein a container (14"a) and the further container (14'''a) are then moved into an additional position (IV) and a further position (III) of a further working station (30"a), respectively.

* * * * *